United States Patent Office 2,980,678
Patented Apr. 18, 1961

2,980,678
PYRIMIDINES

Bernard William Langley, Alderley Park, Macclesfield, England, assignor to Imperial Chemical Industries Limited, London, England, a corporation of Great Britain No Drawing. Filed Dec. 15, 1958, Ser. No. 780,208

Claims priority, application Great Britain Jan. 6, 1958

7 Claims. (Cl. 260—256.4)

This invention relates to pyrimidines and more particularly it relates to new 4-hydrazino-2:6-dihydroxypyrimidines which are useful as antibacterial agents and as intermediates in the preparation of compounds possessing therapeutic properties.

According to the invention we provide 4-hydrazino-2:6-dihydroxypyrimidines of the formula:

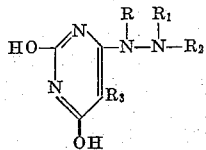

wherein R and $R_1$ stand for hydrogen or for alkyl radicals, $R_2$ stands for hydrogen or for an aryl radical, optionally substituted, and $R_3$ stands for hydrogen or for an alkyl radical.

As a suitable value of R and/or $R_1$ where R and $R_1$ stand for alkyl radicals there may be mentioned for example the methyl radical.

As suitable values of $R_2$ where $R_2$ stands for an aryl radical there may be mentioned for example a phenyl radical optionally substituted by halogen atoms such as chlorine, bromine or fluorine atoms, or by lower alkyl radicals such as a methyl radical.

As a suitable value of $R_3$ where $R_3$ stands for an alkyl radical there may be mentioned for example the methyl radical.

According to a further feature of the invention we provide a process for the manufacture of the said 4-hydrazino-2:6-dihydroxypyrimidines which comprises interaction of a dihydroxypyrimidine of the formula:

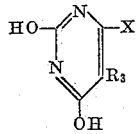

wherein $R_3$ has the meanings stated above and wherein X stands for a replaceable substituent or a salt thereof and a hydrazine of the formula:

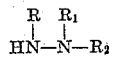

wherein R, $R_1$ and $R_2$ have the meanings started above, or a salt thereof.

As a suitable replaceable substituent there may be mentioned for example a halogen atom such as a chlorine atom, or a methylsulphonyl radical or a phenylsulphonyl radical.

The reaction may conveniently be carried out by heating the reactants together in an inert medium for example in an aqueous medium, optionally in the presence of an acid-binding agent for example an excess of the hydrazine component, a tertiary organic base for example triethylamine, tri-n-butylamine or triethanolamine or an inorganic acid-binding agent for example sodium carbonate, or in the presence of a buffer for example sodium acetate.

As stated above, the pyrimidine derivatives of this invention possess antibacterial properties and they are particularly valuable for use as antibacterials in urinary infections. The said pyrimidine derivatives inhibit the growth of micro-organisms for example *Streptococcus faecalis, Streptococcus pyogenes, Streptococcus agalactiae, Streptococcus pneumoniae* and *Staphylococcus aureus*. The derivatives are effective when administered orally for example as pharmaceutical compositions in the form of powders, tablets or suspensions in liquid media and this comprises a further feature of the invention. They are also valuable as intermediates for the preparation of compounds possessing therapeutic properties for example the corresponding 4-arylazo-2:6-dihydroxypyrimidine derivatives which also possess antibacterial properties.

The invention is illustrated but not limited by the following examples in which the parts are by weight.

Example 1

A solution of 1 part of 4-chloro-2:6-dihydroxypyrimidine in a mixture of 1 part of 100% hydrazine hydrate and 10 parts of water is heated under reflux for one hour and is then cooled and filtered. There is obtained 4-hydrazino-2:6-dihydroxypyrimidine as colourless crystals which decompose at 290° C.

Example 2

A solution of 1 part of 4-chloro-2:6-dihydroxy-5-methylpyrimidine in 50 parts of water containing 1 part of 100% hydrazine hydrate is refluxed overnight in an atmosphere of nitrogen. The mixture is cooled and filtered and the crystalline residue is recrystallised from water. 4-hydrazino-2:6-dihydroxy-5-methylpyrimidine is obtained as colourless needles which melt with decomposition at 275–276° C.

The 4-chloro-2:6-dihydroxy-5-methylpyrimidine used as starting material is prepared as follows:

A mixture of 1 part of 4-chloro-2:6-dimethoxy-5-methylpyrimidine, 1 part of aqueous 36% hydrochloric acid, 10 parts of water and 40 parts of acetic acid is refluxed for 2½ hours and evaporated to dryness in vacuo. Recrystallisation of the residue from water gives 4-chloro-2:6-dihydroxy-5-methylpyrimidine, M.P. 266–267° C.

Example 3

A mixture of 11 parts of 4-chloro-2:6-dihydroxypyrimidine, 32 parts of methylhydrazine sulphate, 18 parts of sodium hydroxide and 500 parts of water is refluxed for four hours. One half of the water is then removed by distillation and the remaining solution is cooled. The mixture is filtered and there is obtained N-methyl - N - (2:6 - dihydroxy - 4 - pyrimidyl)hydrazine as colourless needles which melt with decomposition at 284–285° C.

Example 4

A mixture of 1.46 parts of 4-chloro-2:6-dihydroxypyrimidine, 2 parts of phenylhydrazine and 100 parts of water is refluxed in an atmosphere of nitrogen for 2 hours. The crystalline deposit which forms on cooling is collected by filtration and washed with water and a little cold ethanol. There is obtained N-phenyl-N'-(2:6-dihydroxy-4-pyrimidyl)hydrazine as pink crystals which decompose at 283–284° C.

Example 5

A mixture of 14.6 parts of 4-chloro-2:6-dihydroxypyrimidine, 11 parts of phenylhydrazine, 50 parts of sodium acetate trihydrate and 1000 parts of water is heated under reflux with stirring in an atmosphere of nitrogen for 16 hours and is then cooled and filtered. The solid residue is washed with water and there is thus obtained N-phenyl - N' - (2:6-dihydroxy - 4 - pyrimidyl)hydrazine which decomposes at 283–284° C.

Example 6

A mixture of 1 part of 2:6-dihydroxy-4-methanesulphonyl pyrimidine, 1 part of phenylhydrazine and 5 parts of water is heated under reflux in an atmosphere of nitrogen for 1 hour and is then cooled. The solid residue is washed with water and there is thus obtained N-phenyl-N'-(2:6-dihydroxy-4-pyrimidyl)hydrazine which decomposes at 283–284° C.

Example 7

A mixture of 1 part of 2:6-dihydroxy-4-benzenesulphonylpyrimidine, 0.8 part of phenylhydrazine, and 250 parts of water is heated under reflux in an atmosphere of nitrogen for 16 hours and then cooled and filtered. The solid residue is washed with water and there is thus obtained N-phenyl-N'-(2:6-dihydroxy-4-pyrimidyl)hydrazine which decomposes at 283–284° C.

The 2:6-dihydroxy-4-benzenesulphonylpyrimidine used as starting material may be prepared as follows: A mixture of 1.46 parts of 4-chloro-2:6-dihydroxypyrimidine, 2.8 parts of sodium benzenesulphinate dihydrate and 50 parts of water is heated under reflux for 1 hour and then cooled and filtered. The solid residue is washed with water and there is thus obtained 2:6-dihydroxy-4-benzenesulphonylpyrimidine which decomposes at 278–280° C.

Example 8

A mixture of 14.6 parts of 4-chloro-2:6-dihydroxypyrimidine, 18 parts of p-fluorophenylhydrazine hydrochloride, 20 parts of sodium acetate trihydrate and 1000 parts of water is heated under reflux with stirring in an atmosphere of nitrogen for 2 hours and then cooled and filtered. The solid residue is washed with water and there is thus obtained N-p-fluorophenyl-N'-(2:6-dihydroxy-4-pyrimidyl)hydrazine which decomposes at 285–290° C.

Example 9

A mixture of 1.46 parts of 4-chloro-2:6-dihydroxypyrimidine, 3.58 parts of p-chlorophenylhydrazine hydrochloride and a solution of 0.8 part of sodium hydroxide in 100 parts of water is heated under reflux in an atmosphere of nitrogen for 2 hours and filtered. The solid residue is washed with water and is then cooled. There is thus obtained N-p-chlorophenyl-N'-(2:6-dihydroxypyrimidyl)hydrazine which darkens at 300° C. and decomposes above 340° C.

Example 10

A mixture of 7.3 parts of 4-chloro-2:6-dihydroxypyrimidine, 10.6 parts of 2:4-dichlorophenylhydrazine hydrochloride, 25 parts of sodium acetate trihydrate and 500 parts of water is heated under reflux with stirring in an atmosphere of nitrogen for 5 hours and is then cooled and filtered. The solid residue is washed with water and with acetone. There is thus obtained N-2:4-dichlorophenyl-N'-(2:6-dihydroxy-4-pyrimidyl)hydrazine which decomposes above 350° C.

Example 11

A mixture of 2 parts of 4-chloro-2:6-dihydroxypyrimidine, 3 parts of p-bromophenylhydrazine hydrochloride, 5 parts of sodium acetate and 150 parts of water is heated under reflux in an atmosphere of nitrogen for 16 hours and is then cooled and filtered. The solid residue is washed with water and with ethanol and there is thus obtained N-p-bromophenyl-N'-(2:6-dihydroxy - 4 - pyrimidyl)hydrazine which decomposes above 320° C.

Example 12

A mixture of 7.3 parts of 4-chloro-2:6-dihydroxypyrimidine, 10 parts of o-tolylhydrazine hydrochloride, 20 parts of sodium acetate trihydrate and 500 parts of water is heated under reflux in an atmosphere of nitrogen for 4 hours and is then cooled and filtered. The solid residue is washed with water and with alcohol and there is thus obtained N-o-tolyl-N'-(2:6-dihydroxy-4-pyrimidyl)hydrazine which decomposes above 340° C.

The process described above is repeated except that the o-tolylhydrazine hydrochloride used as starting material is replaced by m-tolylhydrazine hydrochloride. There is thus obtained N-m-tolyl-N'-(2:6-dihydroxy-4-pyrimidyl)hydrazine which decomposes at 205–210° C.

The process described above is repeated except that the o-tolylhydrazine hydrochloride used as starting material is replaced by p-tolylhydrazine hydrochloride. There is thus obtained N-p-tolyl-N'-(2:6-dihydroxy-4-pyrimidyl)hydrazine which decomposes at 277–278° C.

What we claim is:

1. 4-hydrazino-2:6-dihydroxypyrimidines of the formula:

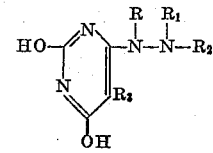

wherein $R$ and $R_1$ are selected from the group consisting of hydrogen and methyl; $R_2$ is selected from the group consisting of hydrogen, phenyl, lower alkyl phenyl and halophenyl and $R_3$ is selected from the group consisting of hydrogen and methyl.

2. 4-hydrazino-2:6-dihydroxypyrimidine.
3. 4-hydrazino-2:6-dihydroxy-5-methylpyrimidine.
4. N-methyl-N-(2:6-dihydroxy-4-pyrimidyl)hydrazine.
5. N-phenyl-N'-(2:6-dihydroxy-4-pyrimidyl)hydrazine.
6. N-halophenyl-N'-(2:6-dihydroxy - 4 - pyrimidyl)hydrazine.
7. N-tolyl-N'-(2:6-dihydroxy-4-pyrimidyl)hydrazine.

References Cited in the file of this patent

UNITED STATES PATENTS

| | | |
|---|---|---|
| 2,211,710 | Zerweck et al. | Aug. 3, 1940 |
| 2,487,569 | Mackey | Nov. 8, 1959 |

OTHER REFERENCES

Byrkit et al.: Ind. Eng. Chem., vol. 42, pages 1862–1863 (1950).